US010914478B2

(12) United States Patent
Miller (10) Patent No.: US 10,914,478 B2
(45) Date of Patent: Feb. 9, 2021

(54) PORTABLE ENERGY GENERATION AND HUMIDITY CONTROL SYSTEM (71) Applicant: Michael Miller, Annapolis, MD (US)

(72) Inventor: Michael Miller, Annapolis, MD (US)

(*) Notice: Subject to any disclaimer, the term of this patent is extended or adjusted under 35 U.S.C. 154(b) by 260 days.

(21) Appl. No.: 15/922,726

(22) Filed: Mar. 15, 2018

(65) Prior Publication Data
US 2019/0285293 A1 Sep. 19, 2019

(51) Int. Cl.
F24F 6/12 (2006.01)
F24F 13/30 (2006.01)
F03B 17/02 (2006.01)
H02K 35/02 (2006.01)
H02K 7/18 (2006.01)
H02K 1/34 (2006.01)
F24F 6/00 (2006.01)

(52) U.S. Cl.
CPC ............... F24F 6/12 (2013.01); F03B 17/02 (2013.01); F24F 13/30 (2013.01); H02K 7/1876 (2013.01); H02K 35/02 (2013.01); F24F 2006/008 (2013.01); F24F 2221/125 (2013.01); H02K 1/34 (2013.01)

(58) Field of Classification Search
CPC ........ F24F 6/12; F24F 13/30; F24F 2221/125; F24F 2006/008; F24F 11/0008; H02K 7/1876; H02K 35/02; H02K 1/34; F03B 17/02
See application file for complete search history.

(56) References Cited

U.S. PATENT DOCUMENTS

| 243,909 A | 7/1881 | Iske |
| 458,872 A | 9/1891 | Van Depeole |
| 3,358,451 A | 12/1967 | Feldman et al. |
| 3,441,482 A | 4/1969 | Avery |
| 3,546,473 A | 12/1970 | Rich |

(Continued)

FOREIGN PATENT DOCUMENTS

| GB | 1251484 A | 10/1971 |
| GB | 1301214 A | 12/1972 |

OTHER PUBLICATIONS

"The Minto Wheel", The Mother Earth News, Issue 40, Jul. 1976.
(Continued)

*Primary Examiner* — Stephen Hobson (57) ABSTRACT

A portable energy generation and humidity control system includes an engine and a humidity control system within a portable frame. The engine includes two containers in communication through a connecting arm having a central hollow bore. A volume of a low boiling point liquid is disposed in the bottom container, and a wire coil extends along the connecting arm. A buoyant permanent magnet is disposed in the central hollow bore. An active heat exchanger is capable of transferring heat to and removing heat from the bottom container. The active heat exchanger includes at least one internal heat exchanger portion and at least one external heat exchanger portion in communication with the internal heat exchanger portion. A humidity control system is supported within the portable frame and is in communication with the engine. The humidity control system and the engine maintain a desired humidity level in the ambient environment.

20 Claims, 4 Drawing Sheets

(56) References Cited

U.S. PATENT DOCUMENTS

| | | | |
|---|---|---|---|
| 3,636,706 | A | 1/1972 | Minto |
| 3,659,416 | A | 5/1972 | Brown |
| 3,901,033 | A | 8/1975 | Mcalister |
| 3,975,097 | A | 8/1976 | Minto |
| 4,051,678 | A | 10/1977 | Yates |
| 4,131,171 | A | 12/1978 | Keyes |
| 4,291,755 | A | 9/1981 | Minto |
| 4,326,132 | A | 4/1982 | Bokel |
| 4,342,920 | A | 8/1982 | Bucknam |
| 4,399,368 | A | 8/1983 | Bucknam |
| 4,403,643 | A | 9/1983 | Minto |
| 4,637,211 | A | 1/1987 | White et al. |
| 5,028,903 | A | 7/1991 | Aubert |
| 5,216,401 | A | 6/1993 | Leupold |
| 5,228,293 | A | 7/1993 | Vitale |
| 5,382,936 | A | 1/1995 | Leupold et al. |
| 5,428,334 | A | 6/1995 | Leupold et al. |
| 5,428,335 | A | 6/1995 | Leupold et al. |
| 5,461,354 | A | 10/1995 | Rosenberg et al. |
| 5,506,558 | A | 4/1996 | Laube |
| 5,517,083 | A | 5/1996 | Whitlock |
| 6,286,310 | B1 | 9/2001 | Conrad |
| 6,688,048 | B2 | 2/2004 | Staschik |
| 6,978,610 | B2 | 12/2005 | Carnahan |
| 7,644,648 | B2 | 1/2010 | Minowa et al. |
| 7,692,320 | B2 | 4/2010 | Lemieux |
| 7,694,515 | B2 | 4/2010 | Miller |
| 8,539,765 | B2 | 9/2013 | Miller |
| 8,633,604 | B2 | 1/2014 | Miller |
| 8,791,781 | B2 | 7/2014 | Miller |
| 9,765,758 | B2 | 9/2017 | Miller |
| 10,100,683 | B2 | 10/2018 | Miller |
| 2002/0100576 | A1 | 8/2002 | Hua |
| 2004/0140875 | A1 | 7/2004 | Strom |
| 2005/0246919 | A1 | 11/2005 | Delons |
| 2005/0252206 | A1 | 11/2005 | Holmevik et al. |
| 2006/0225414 | A1 | 10/2006 | Fan |
| 2009/0309371 | A1 | 12/2009 | Ballard |
| 2011/0041499 | A1 | 2/2011 | Godwin |
| 2011/0169277 | A1 | 7/2011 | Miller |
| 2013/0062457 | A1 | 3/2013 | Deakin |
| 2013/0205768 | A1 | 8/2013 | Kim |
| 2013/0270635 | A1 | 10/2013 | Parris et al. |
| 2013/0270835 | A1 | 10/2013 | Pingitore et al. |
| 2014/0109991 | A1 | 4/2014 | Travis |
| 2015/0211479 | A1 | 7/2015 | Tai et al. |
| 2018/0313556 | A1* | 11/2018 | Seo .................. H02J 50/15 |

OTHER PUBLICATIONS

"Wally Minto: Freon Power Wheel" from www.rexreasearch.corn (37 pages).
"Wally Minto's Wonder Wheel", Popular Science, Mar. 1976.
International Search Report and Written Opinion in PCT Application PCT/US08/54243 dated Jul. 18, 2008.

* cited by examiner

PORTABLE ENERGY GENERATION AND HUMIDITY CONTROL SYSTEM

FIELD OF THE INVENTION

The present invention is directed to improvements in the construction and operation of low temperature gradient engines, electrical generators and climate control systems.

BACKGROUND OF THE INVENTION

A slow moving, high torque engine or generator is known that operates on a very small temperature differential. This engine is commonly referred to as a Minto Wheel after its inventor Wallace Minto. The engine is arranged as a wheel that contains a series of sealed containers. The sealed containers are placed around the rim of the wheel and are aligned as diametrically opposed pairs. Each diametrically opposed pair is in fluid connection through a tube. The wheel rotates in a vertical plane. In any given pair at any given moment in time during the rotation, one of the containers is moving in a generally upward direction, and the other container is moving in a generally downward direction. At one position in the rotation, the containers are aligned vertically, with one container at the top being in the uppermost position and one container at the bottom being in the lowermost position. Each container moves between the uppermost and lowermost positions.

Each opposed pair of containers and the associated connecting tube form a sealed unit. Into each sealed unit a volume of a low-boiling liquid, for example propane, butane, carbon dioxide or Freon is introduced. For a given pair located at or near the vertically aligned position, most of the introduced volume of liquid is disposed in the lowermost container. The lowermost container is then exposed to a very mild increase in temperature, for example an increase of as little as 2° centigrade or about 3.5° F. Since such small temperature differences are abundant in nature, for example the temperature difference between water and cooler air or the difference between direct sunshine and shade, the heat necessary for imparting the mild increase in temperature is derived from a passive source. This passive source is a water bath containing hot, solar heated water through which the containers pass as the wheel rotates.

Improvements in the use of low boiling point liquids to generate mechanical work utilized the improved heat transfer properties of active heat exchangers to achieve the small temperature differentials. In addition to rotational motion that produce low speed, high torque mechanical work, electrical power is generated from reciprocating versions of the low boiling point liquid. When active heat exchangers, e.g., heat pumps, are used to transfer heat to and from the low boiling point liquid, these active heat exchangers also transfer heat to and from the ambient environment containing the engine and can generate condensate during this heat transfer. Therefore, arrangements are desired that utilize the electrical energy generated by the reciprocating, low boiling point liquid engine, the heat transferred by the engine into the ambient environment and the condensate produced during heat transfer. In particular, these arrangements would be portable and suitable for use in a single room of a building, i.e., house or office.

SUMMARY OF THE INVENTION

Systems in accordance with exemplary embodiments of the present invention utilize an engine with active heat transfer devices such as heat pumps in combination with a humidity control system to provide a controlled climate, i.e., temperature and humidity, within an ambient environment. The ambient environment is preferably a room within a building such as a house, dwelling or office building. Therefore, the resulting energy generation and humidity control system is portable. Preferably, the portable energy generation and humidity control system is sized to be moved easily among rooms within a building. The portable energy generation and humidity control system includes a frame that contains all components of the portable energy generation and humidity control system including the engine that generates electrical energy and condensate and the humidity control system that works in conjunction with the engine to maintain a desired humidity level within the ambient environment. In particular, the humidity control system utilizes the condensate produced by the engine in a humidifier to maintain the desired humidity level.

In one embodiment, the present invention is directed to an engine that includes two containers arranged as a diametrically opposed pair in a vertical alignment having a top container and a bottom container. The top container has a first enclosed volume, and the bottom container has a second enclosed volume. Preferably, the first volume is greater than the second volume. A connecting arm is provided in communication with each container. This connecting arm includes a central hollow bore, and the diametrically opposed pair are in fluid communication through the hollow bore of the connecting arm. A volume of a low boiling point liquid is disposed in the bottom container. A wire coil is wrapped around or is contained within the connecting arm between the two containers, and a flotation collar containing a permanent magnet is disposed in the hollow bore.

The engine includes an active heat exchanger, e.g., a heat pump, in communication with the bottom container to transfer heat to and to remove heat from the bottom container. In one embodiment, the active heat exchanger includes a first active heat exchanger portion in communication with the liquid disposed in the bottom container and a second active heat exchanger portion disposed in the bottom container in a gas space above the liquid. The active heat exchanger also includes at least one additional active heat exchanger portion in communication with the controller portion. In one embodiment, the additional active heat exchanger portion is arranged to exchange heat with the ambient environment. Preferably, the additional active heat exchanger portion is in communication with the humidity control system to produce condensate. Preferably, the heat exchanger portions only transfer heat from the ambient environment, i.e., the room or rooms inside a house or building, into the engine. The active heat exchanger includes a controller portion in communication with the first, second and additional heat exchanger portions. The controller portion includes at least one compressor, at least one valve and control electronics. The controller portion directs the active heat exchanger to either transfer heat to or to extract heat from the bottom container.

Exemplary embodiments are directed to a portable energy generation and humidity control system having a portable frame, an engine supported within the portable frame and configured to generate electrical energy and a humidity control system supported within the portable frame and in communication with the engine. The engine includes two containers arranged as a diametrically opposed pair in a vertical alignment having a top container and a bottom container and a connecting arm in communication with each container. The connecting arm has a central hollow bore, and the diametrically opposed pair are in fluid communication through the hollow bore of the connecting arm. A volume of a low boiling point liquid is disposed in the bottom container, and a wire coil extends along the connecting arm between the two containers. A buoyant permanent magnet is disposed in the central hollow bore, and an active heat exchanger is in communication with the bottom container and capable of transferring heat to and removing heat from the bottom container. The active heat exchanger includes at least one internal heat exchanger portion disposed in the bottom container in communication with at least one of the liquid disposed in the bottom container and a gas space above the liquid and at least one external heat exchanger portion in communication with the internal heat exchanger portion and arranged to exchange heat with an ambient environment. The humidity control system works in conjunction with the engine to maintain a desired humidity level in the ambient environment.

In one embodiment, the engine and humidity control system are contained completely within the portable frame and the portable frame is sized to be moved between rooms within a building. In one embodiment, the portable frame comprises a rolling frame. In one embodiment, the humidity control system includes a liquid reservoir in communication with the external heat exchanger portion to collect condensate generated by the external heat exchanger portion and a humidifier in communication with the liquid reservoir to introduce liquid from the liquid reservoir into the ambient environment. In one embodiment, the humidity control system also includes at least one humidity sensor to monitor a current humidity level in the ambient environment. In one embodiment, the humidifier is a cold mist humidifier. In one embodiment, the cold mist humidifier is an evaporative humidifier or an ultrasonic humidifier.

In one embodiment, the humidity control system is in communication with the wire coil to obtain electricity from the engine. In one embodiment, the ambient environment is a room within a building. In one embodiment, the at least one internal heat exchanger portion includes a first heat exchanger portion disposed in the bottom container in communication with the liquid disposed in the bottom container and a second heat exchanger portion disposed in the bottom container in a gas space above the liquid. In addition, the at least one external heat exchanger portion includes a third heat exchanger portion. In one embodiment, the active heat exchanger includes a controller portion in communication with the first, second and third heat exchanger portions and the humidity control system. In addition, the controller portion includes at least one compressor, at least one valve and control electronics. The controller portion is capable of directing the active heat exchanger to either transfer heat to or to extract heat from the bottom container.

In one embodiment, the low boiling point liquid includes chlorofluorocarbons, hydrofluorocarbons, liquid ammonia, propane, carbon dioxide or butane. In one embodiment, the buoyant permanent magnet is a hollow spherical magnet or a hollow weighted buoy shaped magnet. In one embodiment, an entire outer surface of the buoyant permanent magnet comprises a first pole. In one embodiment, the system further includes a biasing member attached to the buoyant permanent magnet and configured to bias the buoyant permanent magnet towards the bottom container.

Exemplary embodiments are also directed to a method for generating energy and controlling humidity on a portable platform. An engine supported within a portable frame is used to generate electrical energy using an active heat exchanger. The active heat exchanger includes an internal heat exchanger portion disposed in a container to exchange heat with a volume of low boiling point liquid and move a buoyant permanent magnet floating in the low boiling point liquid reciprocally through a wire coil extending along a hollow bore in communication with the container. An external heat exchanger portion is in communication with the internal heat exchanger portion and is disposed in an ambient environment outside the container to exchange heat with the ambient environment. A humidity control system supported within the portable frame and in communication with the external heat exchanger portion is used to obtain condensate generated by the external heat exchanger portion and to use the condensate to maintain a desired humidity level in the ambient environment.

In one embodiment, the using the humidity control system includes using the condensate to maintain an increased humidity level. In one embodiment, using the humidity control system includes using the condensate to balance humidity removed from the ambient environment by the engine and to maintain an existing humidity level in the ambient environment. In one embodiment, the method further also includes delivering electrical energy generated by the engine to an electrical grid of an energy supplier. In one embodiment, delivering electrical energy to the electrical grid further includes storing the electrical energy and delivering the electrical energy to the electrical grid intermittently only during times of peak electrical demand in the electrical grid.

DETAILED DESCRIPTION

Systems and methods in accordance with exemplary embodiments of the present invention are directed to portable energy generation and humidity control systems that combine engines incorporating active heat exchangers, for example heat pumps, and expand and condense low-boiling point liquids in a sealed reciprocating device to produce useful electrical energy with a humidity control system. The active heat exchanger is used to move heat from the ambient environment into the low-boiling point liquid contained within the engine. In an embodiment where the active heat exchanger is a heat pump, the evaporation and condensation of a refrigerant are used to transfer heat into, and if desired out of, the low-boiling point liquid of the engine. The operation of heat pumps generally is known in the art. The heat pump consumes energy, for example electrical energy, to power an electric compressor. However, the heat pump can move or transfer more energy than it consumes. For example, the consumption of one unit of electrical energy by the heat pump results in the transfer of three, four or five units of thermal or heat energy. This transferred heat energy is used by the engine to increase the temperature of the low-boiling point liquid, which is used to produce the desired power output from the engine. This ability to use one unit of energy to transfer three or more units of energy is used to produce a desired electrical or mechanical output and provides an increased operating efficiency in exemplary embodiments of engines in accordance with the present invention.

Figure 1:
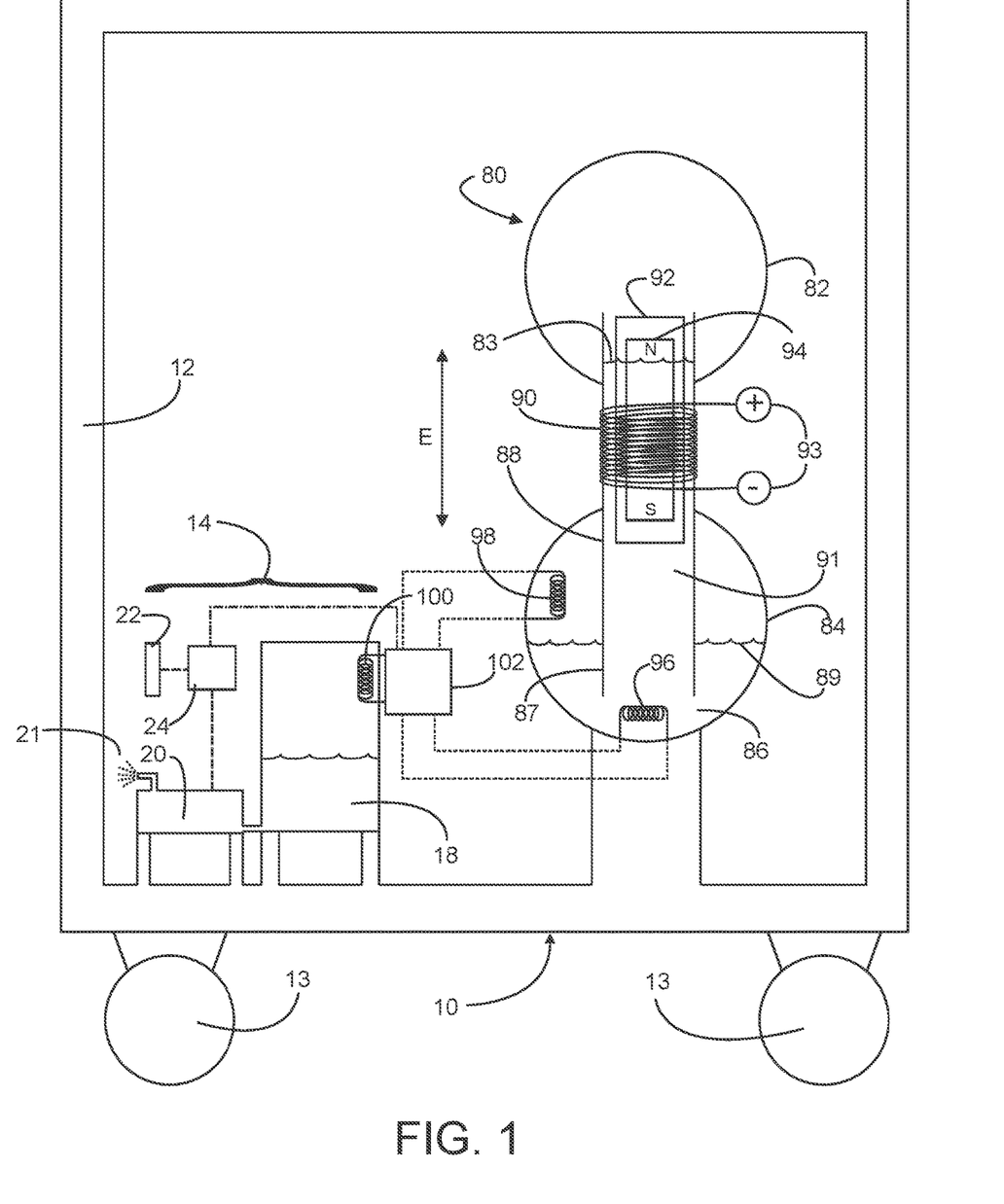
FIG. 1 is a schematic representation of an embodiment of a portable energy generation and humidity control system in accordance with the present invention.

Referring initially to FIG. 1, exemplary embodiments are directed to portable energy generation and humidity control system 10. The system includes a portable frame 12. Suitable materials for the portable frame include plastics and metals. Suitable metals include stainless steel. In one embodiment, the frame is formed from tubular steel, for example, rectangular tubular steel. In one embodiment, all components of the portable energy generation and humidity control system are contained within the portable frame. Therefore, the portable frame includes all the internal support members to support the components of the portable energy generation and humidity control system.

The portable frame is sized to be moved from room to room within a building, for example, a house or other dwelling or an office. This sizing includes the width, length and height of the portable frame. Therefore, the portable frame can fit through standard door frames, e.g., 12, 24, 30 or 36 inch door frames. In one embodiment, movement of the portable frame is facilitated by a plurality of wheels 13, attached to the bottom the portable frame. Therefore, the portable frame is a rolling frame. In one embodiment, the wheels are attached using pivoting mounts. In one embodiment, the wheels include locking mechanisms. The portable frame can also include handles to facilitate moving or lifting the portable frame. In one embodiment, the wheels are in communication with motors to provide for motorized motion of the portable frame.

The portable energy generation and humidity control system includes at least one engine 80 supported within the portable frame and configured to generate electrical energy. Suitable engines are disclosed in U.S. Pat. No. 7,694,515, which issued Apr. 13, 2010 and U.S. Pat. No. 8,539,765, which issued Sep. 24, 2013, the entire disclosures of which are incorporated herein by reference. While discussed with respect to a reciprocating engine that generates electricity, embodiments of the portable energy generation and humidity control system could utilize embodiments of rotating engines that produce mechanical work, for example, to drive a generator or the humidity control system. In one embodiment as illustrated, each engine 80 within the portable frame is arranged as an electrical generator that produces electrical energy. In general, each generator includes two containers arranged as a diametrically opposed pair in a vertical alignment having a top container and a bottom container. As illustrated, the generator includes a first container 84 located in a bottom or lowermost position and a second container 82 located in a top or uppermost position. The first and second containers are fixedly secured together and brought into fluid contact through a connecting arm 88 that includes a central tube or hollow bore 91. In one embodiment, the top container is larger in volume than the lower container to minimize compression backpressure. Preferably, the top container has a volume sufficient to permit compression of the gas phase of the refrigerant in the uppermost container as the low boiling point liquid in the lower container is displaced upwards through the connecting arm by the pressure created in the lowermost container by the introduction of heat into the lowermost container by means of active heat transfer. Disposed within the first container is a quantity of the low-boiling point liquid 86. Suitable low-boiling points liquids include, but are not limited to, chlorofluorocarbons, hydrofluorocarbons, liquid ammonia, propane, carbon dioxide and butane. A sufficient amount of liquid is disposed in the first container such that the open end 87 of the connecting arm that is disposed in the first container is always located below the surface level of the liquid. Therefore, during all cycles of the engine, the open end of the connecting arm is below the surface of the liquid.

Located within the central bore of the connecting arm is a flotation collar 92 encasing a permanent magnet 94. The flotation collar is made of a material that is buoyant in and is compatible with the low-boiling point liquid. In one embodiment, the flotation collar can also include a flexible collar or flange 83 that forms a relatively gas tight or refrigerant tight seal between the flotation collar and the sides of the connecting arm. This tight seal, however, is not needed for floating but is used to minimize the distance from the flotation collar to the sides of the connecting arm or tube to minimize friction. A sufficient amount of the flotation collar material is included to float the permanent magnet. In one embodiment, the magnet is round or spherical and hollow, obviating the need for a flotation collar.

In another embodiment, the magnet is buoy shaped, and hollow or substantially hollow. The entire outside surface, or a substantial portion of the outside surface of the buoy shaped magnet has the same polarity, and the inside surface of the buoy shaped magnet has an opposite polarity. The buoy shaped magnet is weighted in its inferior extent. The weighted inferior portion of the buoy shaped magnetic flotation assembly is configured to effect an optimal orientation of the magnetic buoy in its position within the meniscus of the liquid/gas phase refrigerant interface, with a portion of the buoy above the meniscus and a portion of the buoy below the meniscus such that the effect of buoyancy is not significantly counteracted as the meniscus carries the buoy upwards through the connecting arm and therefore through the resistance coil. At the same time, the buoy shaped magnet is deep enough within the meniscus to minimize friction causing oscillations of the buoy shaped magnet as it is carried up through the connecting arm by the rising meniscus. In one embodiment, the magnetic buoy or buoy shaped magnet includes a plurality of vertical ribs on the outside surface to minimize frictional contact with the internal bore of the connecting arm while simultaneously enhancing stability. The distal extend of the buoy shaped magnet contains a material having a high specific gravity. Suitable high specific gravity materials, include, but are not limited to lead, liquid mercury, iron, tungsten and osmium.

As illustrated, the poles of the permanent magnet are aligned vertically. A wire coil 90 extends along the connecting arm between the first and second containers. In one embodiment, the wire coil is wound around the exterior of the connecting arm. In one embodiment, the wire coil is disposed within the connecting arm. Suitable wire for the wire coil includes copper wire. Electrical leads or connections 93 are disposed on either end of the wire coil. These leads are connected to an electrical load, e.g., a battery or motor, as desired. In one embodiment, the electrical leads are connected to components of the humidity control system. Preferably, most of the electricity generated by converting the heat removed from a given living space into electricity is sold to an electrical utility, i.e., power generation or power distribution company, using, for example, a smart gird or inverter system provided by the power company.

In general, the engine includes at least one internal heat exchanger portion that is disposed in the bottom container in communication with at least some of the liquid disposed in the bottom container and a gas space above the liquid, and at least one external heat exchanger portion is provided in communication with the internal heat exchanger portion and arranged to exchange heat with an ambient environment. For a portable system utilized within rooms of a house or office building, the ambient environment is one or more rooms within the building, i.e., house or office building. Additional internal and external heat exchanger portions can be provided for additional heat transfer between the engine and ambient environment. In one embodiment, a plurality of similarly configured companion units are used such that once heat is introduced into the system by active heat exchange, heat is either converted into electricity by the action of the device or actively removed from one companion unit and transferred into a second companion unit to affect the subsidence of the liquid/gas phase refrigerant meniscus of the first unit. In one embodiment, this allows the weighted buoy shaped magnetic floatation assembly to descend downward through its respective connecting arm.

In one embodiment, external heat exchangers are included that are disposed in an exterior location, i.e., outside the building. In one embodiment, the portable energy generation and humidity control system is deployed and contained within a confined space, e.g., a room or rooms of a house, apartment or office. The portable energy generation and humidity control system and cools and air conditions that confined space with no outside connection, e.g., no external heat exchangers in an exterior location. However, an inverter with smart grid access, for example as supplied by an electric utility company, is included with the portable energy generation and humidity control system to convert the heat removed from this given confined space into electricity that is transferred or sold to that electric utility.

In one embodiment, the humidity removed from the space, e.g., the confined space, is returned to that space, for example, using an integrated cold mist humidifier. Reintroducing humidity into the space makes operation of the portable energy generation and humidity control system humidity neutral. In another embodiment, water is removed from the air in the dehumidifier operational mode of the portable energy generation and humidity control system. The obtained water is sequestered in an internal emptiable receptacle. In another embodiment, the internal receptacle is filled with water, and this water is introduced into the space to increase the humidity of the space while removing heat from that same space and converting that heat into electricity, which is introduced into the local power grid. Using the portable energy generation and humidity control system to increase humidity is desirable in dry or desert areas.

As illustrated, the engine includes two internal heat exchanger portions. A first heat exchanger portion 96 of an active heat exchanger is disposed within the first container in contact with the low-boiling point liquid. In one embodiment, a second heat exchanger portion 98 is also disposed in the first container in the space above the liquid. The first and second heat exchanger portions are in contact with a controller portion 102 that contains pumps, valves and electronics, e.g., logic control unit and processor, to control the operation of all active heat exchangers. To transfer heat out of containers, one or more additional heat exchanger portions are provided in contact with the controller portion. These additional heat exchanger portions provide for the transfer of heat between the containers and the ambient environment as well as between companion units. Therefore, the additional heat exchanger portion can be the external heat exchanger portion 100.

Each active heat exchanger is capable of transferring heat between containers, removing heat from each container, adding heat to each container and transferring heat between each container and the ambient environment. In one embodiment, each active heat exchanger includes a pump portion and at least one exchanger portion in communication with the pump portion through suitable piping and connections. Suitable exchanger portions include, but are not limited to, pipes, coils, radiators and arrangements of copper surfaces having increased surface area.

In operation, the active heat exchanger moves heat from the ambient atmosphere into the bottom container through the heat exchange portion disposed within that container. In one embodiment, heat is also moved from the upper or top container using the heat exchange portion disposed within that container to either the ambient atmosphere, the bottom container or both the ambient atmosphere and the bottom container, or to a companion unit. Moving heat into the bottom container introduces heat into the low-boiling point liquid in that container. This increases the vapor pressure above the liquid, moving liquid up through the connecting tube or arm from the first or bottom container upwards toward the second or top container. In one embodiment, the liquid does not enter the uppermost container. The gas phase refrigerant within the connecting arm and within the uppermost chamber is slightly compressed, creating a slight back pressure that is inversely proportional to the volume of the uppermost chamber.

As illustrated, the engine 80 utilizes the active heat exchanger to extract heat from the ambient environment. The active heat exchanger, for example a heat pump, consumes one unit of electrical energy to transfer 3, 4 or 5 units of heat energy. The inputted energy in the form of heat is introduced into the first container through at least one of the first and second heat exchanger portions. The introduction of heat energy into the first container increases the vapor pressure above the low-boiling point liquid in the bottom or lowermost container, forcing the liquid up through the connecting tube in the direction of the top or uppermost container, which acts as a compression chamber, thereby allowing the gas phase of the low-boiling point liquid contained within the connecting tube to pass into the uppermost container as the liquid phase rises within the connecting arm forcing the gas phase within the connecting tube upwards and into the uppermost chamber. This increases the vapor pressure within the uppermost chamber. The rising level of liquid in the tube floats or pushes the magnet through the tube and through the wire windings. The first container is then allowed to cool either passively or through the use of at least one of the first and second heat exchanger portions by transferring heat from that unit into the lowermost container of a companion unit. When then first container is cooled, for example by a few degrees, the vapor pressure above the liquid in the first container will decrease. The level of fluid in the tube will fall down through the connecting arm, and the magnet will also fall back through the tube and the wire windings. This process of heating and cooling is continued, and the magnet oscillates up and down through the tube and wire windings in the direction as indicated by arrow E. The vertical oscillation of a fixed magnet through the wire coil induces a current in the windings that is communicated to the leads and the loads attached to those leads.

The portable energy generation and humidity control system also includes a humidity control system 14 that is also supported by and contained within the portable frame 12. The humidity control system is in communication with the engine 80. Therefore, the humidity control system works in conjunction with the engine to maintain a desired humidity level in the ambient environment while generating electricity. In one embodiment, the humidity control system works in conjunction with the engine to increase the humidity level within the ambient environment. Alternatively, the humidity control system works in conjunction with the engine to decrease the humidity level within the ambient environment. In one embodiment, the external active heat exchanger removes moisture from the ambient environment, and the humidity control system replaces or reintroduces that moisture into the ambient environment so that the portable energy generation and humidity control system operates to neither increase nor decrease the humidity level, i.e., operates in a neutral humidity mode.

The humidity control system includes at least one liquid reservoir 16 in communication with each external heat exchanger portion. The liquid reservoir collects condensate generated by the external heat exchanger portion. In one embodiment, the liquid reservoir can include a drain or spigot to remove or to obtain the captured condensate. Therefore, the humidity control system is used as a source of water and a suitable cold water dispenser can be integrated into the humidity control system. Purification filters and internal ultraviolet (UV) radiation mechanisms can be integrated to maintain the sanitary integrity of this water supply. In one embodiment, the liquid reservoir is also in communication with an external source or secondary source of water. Therefore, the liquid reservoir holds a volume of water greater than the amount of water generated by the external heat exchanger portion. This embodiment is utilized when the humidity control system is operated to increase a humidity level in the ambient environment.

The humidity control system also includes a humidifier in communication with the liquid reservoir. The humidifier produces a mist or aerosol 21 using the water from the liquid reservoir to introduce the water from the liquid reservoir into the ambient environment. Any suitable type of humidifier known and available in the art can be used. In one embodiment, the humidifier is a cold mist humidifier. Suitable cold mist humidifiers include, but are not limited to, evaporative humidifiers and ultrasonic humidifiers.

The humidity control system includes at least one humidity sensor 22 to monitor a current humidity level in the ambient environment. Alternatively, the humidity control system is in communication with a humidity sensor contained in the separate climate control system or heating, ventilation and cooling system associated with the ambient environment. In one embodiment, the humidity control system includes a humidity controller portion 24 in communication with the humidifier, humidity sensor and the controller portion 102 of the engine. The humidity controller portion contains the electronics including a logical controller and processor, power supply, wireless communication modules, input devices, displays, switches and relays to control the operation of the humidifier and, working in conjunction with the controller portion, the external active heat exchanger. In one embodiment, one or more components of the humidity control system is in communication with the electrical leads of the wire coil to obtain electricity from the engine.

Figure 2:
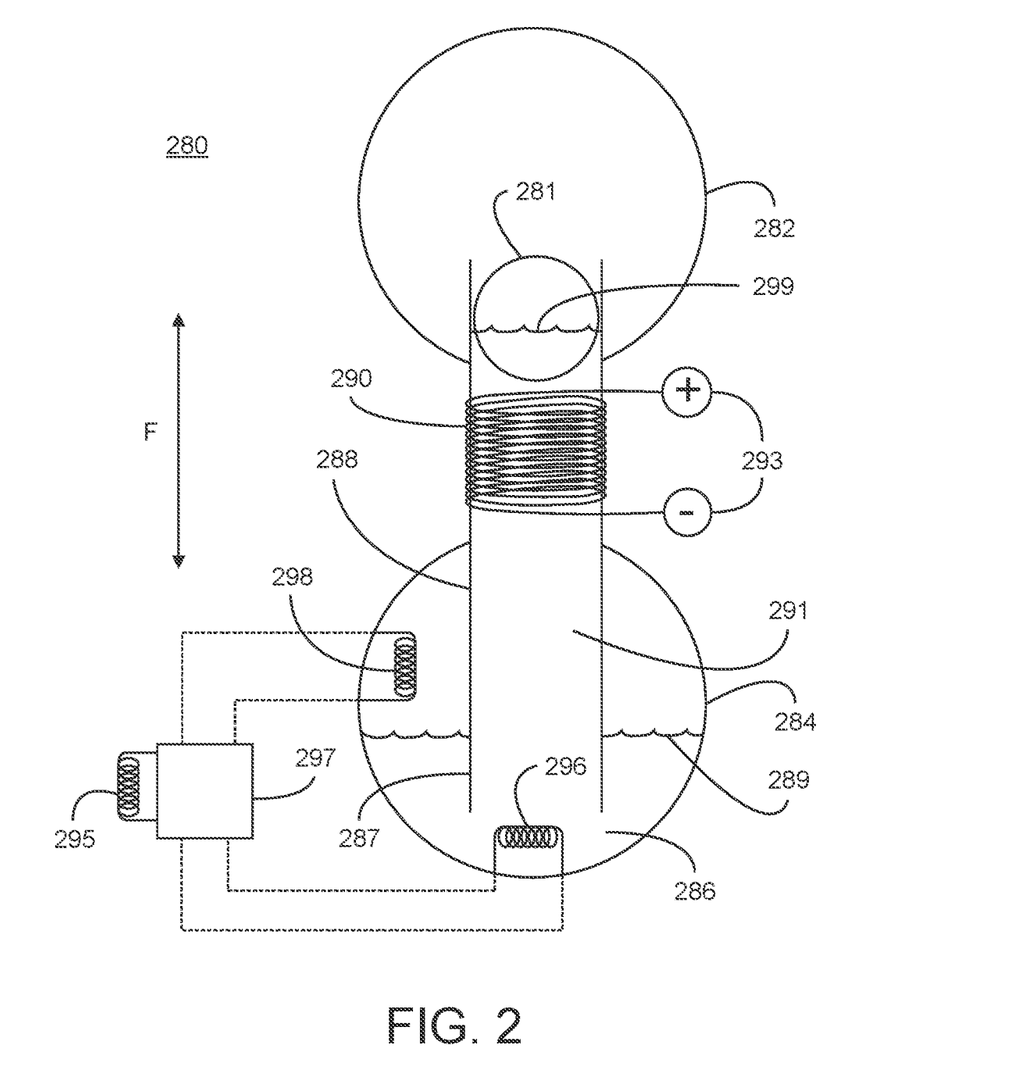
FIG. 2 is a view of another embodiment of the engine in accordance with the present invention.

Referring to FIG. 2, another embodiment of the reciprocating electrical generator 280 is illustrated that utilizes a spherical magnet 281. This generator 280 includes a first container 284 located in a bottom or lowermost position and a second container 282 located in a top or uppermost position. The first and second containers are fixedly secured together and brought into fluid contact through a connecting arm 288 that includes a central tube or hollow bore 291. In one embodiment, the top container is larger in volume than the lower container to minimize compression back pressure. Preferably, the top container has a volume sufficient to permit compression of the gas phase of the low boiling point liquid in the lower container. Disposed within the first container is a quantity of the low-boiling point liquid 286. A sufficient amount of liquid is disposed in the first container such that the open end 287 of the connecting arm that is disposed in the first container is always located below the surface level 289 of the liquid in the first container 284. Therefore, during all cycles of the engine, the open end of the connecting arm is below the surface of the liquid.

The spherical magnet 281 is located within the central bore 291 of the connecting arm 288 and is buoyant. In one embodiment, the spherical magnet 281 includes a buoyant material that is compatible with the low-boiling point liquid. Alternatively, the spherical magnet 281 is a hollow sphere. Any suitable arrangement of the magnet described herein including the weighted magnetic buoy shaped flotation assembly described above can be used. In one embodiment, the spherical magnet has a polarity that is aligned about the equator of the sphere. Therefore, the top of the sphere is one pole, and the bottom of the sphere is the opposite pole. Preferably, the spherical magnet is constructed to provide a uniform charge across the entire surface of the sphere. Therefore, the entire outer surface of the sphere is a first pole, and the entire inner surface of the sphere is a second pole that is magnetically opposite the first pole.

Figure 3:
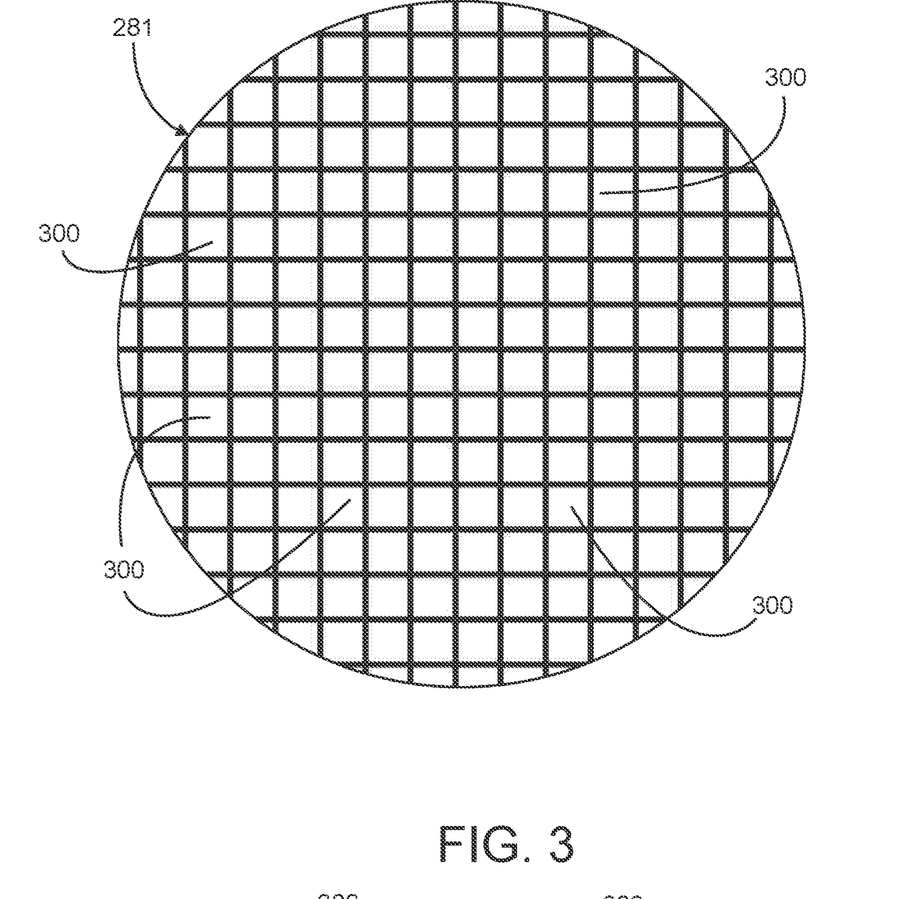
FIG. 3 is a schematic representation of an embodiment of a spherical magnet for use in an engine in accordance with the present invention.
Figure 4:
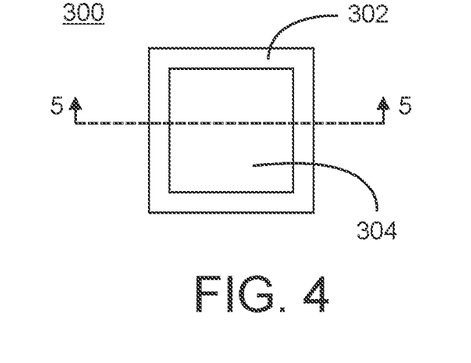
FIG. 4 is a schematic representation of an embodiment of an individual plate magnet for use in the spherical magnet of FIG. 3.
Figure 5:
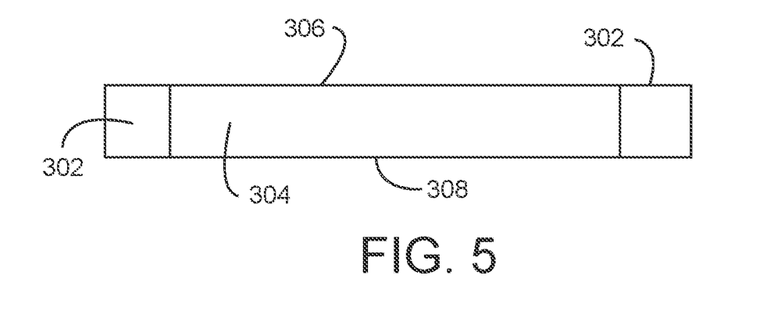
FIG. 5 is a view through line 5-5 of FIG. 4.

Referring to FIG. 3-5, an embodiment of a hollow spherical magnet 281 is illustrated. As illustrated, the hollow spherical magnet is constructed from a plurality of individual magnets 300 that are arranged to form the outer layer of the sphere. In one embodiment, each individual magnet is shaped like a wedge having an outer surface with a curvature suitable for the surface of the sphere. These individual wedge pieces fit together to form the sphere. Preferably, each individual magnet 300 is a flat or plate magnet that is shaped to a curvature suitable for the surface of the sphere. Each individual magnet 300 represents a generally rectangular or square section of the surface of the sphere, and the individual rectangles are two-dimensional rectangular plates that are placed together with their sides touching. The individual magnets 300 are placed together so that the outer layer of the sphere forms a fluid tight surface. Suitable methods for joining the magnets together include using adhesives such as glues or epoxies. The number and size of the individual magnets 300 can be varied as desired and can be varied from 2 or 4 magnets to larger numbers of magnets.

Two or more of the individual magnets can be arranged on the surface of the sphere so that the sides that are touching are edges of the actual plate magnets. Therefore, groupings of individual magnets along the surface of the sphere form larger magnets that constitute a spherical section. Preferably, a separate non-magnet material is provided between adjacent edges of some of or all the edges of the individual magnets. For example, the non-magnetic material can be provided between edges so that two lines of non-magnetic material are provided that divide the sphere into four equal areas, each area having at least one and preferably a grouping of individual magnets. Additional non-magnetic material between the edges can be provided until all the edges between adjacent individual magnets are spaced apart by non-magnet material. Even though non-magnet material is used, the surface of the sphere remains fluid tight. The center of the sphere is hollow or may contain a buoyant material such as wood or polystyrene.

In one embodiment as is shown in FIG. 4, each individual magnet includes a central magnet portion 304 and an outer portion 302. The outer portion extends around all the edges of the central magnet portion and is preferably of a uniform thickness. As shown in FIG. 5, each central magnet portion has a first face 306 with a first polarity and a second face 308 opposite the first surface and having a second opposite magnetic polarity. Therefore, each individual magnet is arranged with its first face on the outer surface of the sphere and its second surface on the inner surface of the sphere. The polarities are configured and arranged so that the entire outer surface of the spherical surface presents a single pole and the internal spherical surface present the opposite magnetic pole. Alternatively, the individual magnets of the spherical magnet can be arranged so that a vertical polarity is achieved on the surface of the sphere. The outer portion is formed from an insulating or dielectric material. The width of the outer portion is selected so that adjacent individual magnets are spaced sufficiently apart so that the magnetic field lines of adjacent magnets do not adversely interfere. In one embodiment, the outer surface of the sphere is coated with a lubricating or friction reducing coating, for example a thin polymer of tetrafluoroethylene fluorocarbon (polytetrafluoroethylene [PTFE]), which is commercially available under the tradename Teflon® from E. I. du Pont de Nemours and Company of Wilmington, Del., to minimize the friction of the sphere as it moves through the bore of the connecting arm.

In one embodiment, the diameter of the spherical magnet is selected to provide a sufficiently tight fit with the bore of the connecting arm to minimize unwanted lateral movement of the sphere while avoiding undesired drag on the bore. Returning to FIG. 2 a wire coil 290 is wound around the exterior of the connecting arm 288 between the first and second containers. Alternatively, the coil can be contained within the connecting arm to minimize the distance between the magnetic lines of force and the coil. Suitable wire for the wire coil includes copper wire. In one embodiment, the wire coil is disposed within the connecting arm, i.e., is not exposed to the exterior or interior of the connecting arm, to minimize a distance between the wire coil and the spherical magnet or other buoyant magnet, which minimizes a distance between the magnet and a magnetic flux density of the magnetic field. In one embodiment, the wire coil is embedded within the material of the connecting arm. Therefore, a portion of the thickness of the connecting arm separates the coil from buoyant magnet and liquid, and the magnetic flotation assembly and magnet are not impinging upon or rubbing against the wire coil. In addition, the connecting arm is providing structural integrity to the wire coil. Electrical leads or connections 293 are disposed on either end of the wire coil. These leads are connected to an electrical load, e.g., a battery or motor, as desired. In one embodiment, a portion and preferably, most of the electricity generated by converting the heat removed from a given living space into electricity is communicated to or sold to an electrical utility, i.e., power generation or power distribution company, using, for example, a smart gird or inverter system provided by the power company. The electricity can be supplied immediately and continuously to an electrical grid using, for example, an inverter. Alternatively, the electricity is supplied to the electrical grid intermittently. For example, the generated electricity is stored in batteries, and the stored energy is transferred to the electrical grid during a pre-determined time period. In one embodiment, the pre-determined time period corresponds to a period of peak electrical demand, thereby maximizing the price paid by the utility company for the transferred energy.

A first heat exchanger portion 296 of an active heat exchanger is disposed within the first container 284 in contact with the low-boiling point liquid 286. A second heat exchanger portion 298 is also disposed in the first container 284 in the space above the liquid. The first and second heat exchanger portions are in contact with a controller portion 297 that contains pumps, valves and electronics to control the operation of the active heat exchanger. One or more additional heat exchanger portions 295 are provided in contact with the controller portion. These additional heat exchanger portions provide for the transfer of heat between the containers and the ambient environment. The operation of the active heat exchanger is the same as the active heat exchangers discussed above, and the active heat exchanger transfers heat into and out of the first container.

The engine 280 utilizes the active heat exchanger to extract heat from the ambient environment. The active heat exchanger, for example a heat pump, consumes one unit of electrical energy to transfer 3, 4 or 5 units of heat energy. The inputted energy in the form of heat is introduced into the first container through at least one of the first and second heat exchanger portions. The introduction of heat energy into the first container increases the vapor pressure above the low-boiling point liquid in the bottom or lowermost container, forcing the liquid up through the connecting tube in the direction of the top or uppermost container, which acts as a compression chamber. The rising level of liquid in the tube 299 floats or pushes the spherical magnet 281 through the tube and through the wire windings. The first container is then allowed to cool either passively or through the use of at least one of the first and second heat exchanger portions. When the first container is cooled, for example by a few degrees, the vapor pressure above the liquid in the first container will decrease. The level of fluid in the tube will fall down through the connecting arm, and the spherical magnet will also fall back through the tube and the wire windings. This process of heating and cooling is continued, and the magnet oscillates up and down through the tube and wire windings in the direction as indicated by arrow F. The vertical oscillation of a fixed magnet through the wire coil induces a current in the windings that is communicated to the leads and the loads attached to those leads.

In one embodiment, oscillation of the magnet, including the spherical magnet is enhanced by providing a biasing member between the magnet and the first container 284. This biasing member biases the magnet downwards into the first container and assists in the downward movement of the magnet when the level of the fluid in the connecting arm drops. At the top of the cycle when the magnet is at its top most position, heat is removed from the system, and the meniscus between the gas and liquid phase of the working fluid in the connecting arm descends. The decent of the working fluid can be faster than the decent of the magnet. The biasing member provides additional force to bring the magnet through the coil at a faster rate.

Suitable biasing members include springs that are attached between the magnet and the first container or weights attached to the magnet. In one embodiment, the spring constant of the biasing spring is chosen so as not to interfere with the upward motion of the floating magnet. Preferably, the biasing member is a ballast drag element that has a specific gravity that is very close to or substantially the same as the working fluid. Therefore, the ballast drag element when attached to the magnet would not add appreciable weight to the magnet as the magnet floats upward. However, an additional constant force is applied to the magnet as the magnet falls down through the connecting arm.

Figure 6:
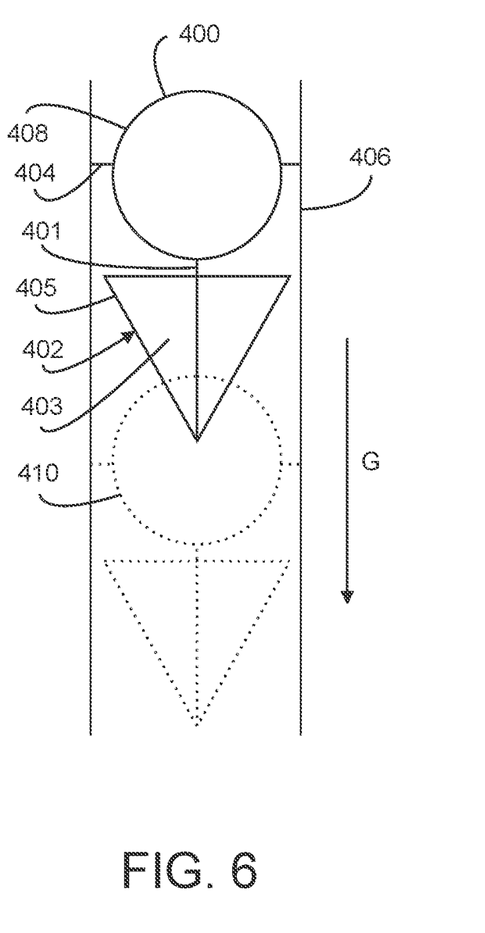
FIG. 6 is a schematic representation of an embodiment of a ballast drag biasing member for use in an engine in accordance with the present invention.

As illustrated in FIG. 6, the spherical magnet 400 is attached through a tether 401 to a ballast drag element 402 having a conical shape. The ballast drag element has an includes a hollow interior 403 that is filled with the working fluid and sides 405 that are formed of a thin material for example a metal or plastic. The ballast drag element can have an open top, a closed top or holes in the top, sides or bottom. The sides are formed to add as little weight as possible and can be selected to have a specific gravity as close as possible to the working fluid. In a first upper position 408, the spherical magnet 400 floats on the surface of the working fluid 404 that has risen up through the connecting arm 406. As the fluid level falls, the spherical magnet falls in the direction of arrow G to a second lower position 410 aided by the weight of the tethered ballast drag element 402 that is filled with the working fluid. As the fluid level rises again and the ballast drag element is below the rising surface of the fluid level, the ballast drag element, being of substantially the same specific gravity as the working fluid, will not add weight to the hollow floating spherical magnet. An alternative arrangement can be provided where the working fluid is forced out of the interior of the ballast drag element when the spherical magnet is in the lower position. The interior of the ballast drag element would then be filled with gas, which would aid in the rising of the spherical magnet. The interior of the ballast drag element would then refill with working fluid when it reached the upper position or as it rose to the upper position. This embodiment could be facilitated by providing fluid communication from the interior of the spherical magnet through the tether to the interior of the ballast drag element. It could also utilize bladders to separate the fluid from the gas, check valves and the heating and cooling cycles of the working fluid.

Figure 7:
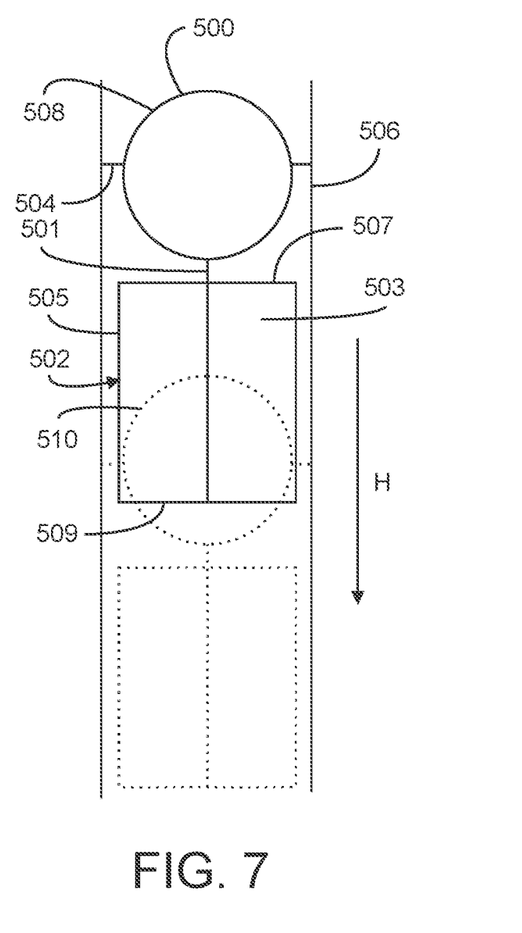
FIG. 7 is a schematic representation of another embodiment of a ballast drag biasing member for use in an engine in accordance with the present invention.

In another embodiment as illustrated in FIG. 7, the spherical magnet 500 is attached through a tether 501 to a ballast drag element 502 having a cylindrical shape. The cylinder includes an open top 507 and a closed bottom 509 to which the tether 501 is attached. Alternatively, the cylinder has a closed top or holes in the top, sides or bottom. The ballast drag element includes a hollow interior 503 that is filled with the working fluid and sides 505 that are formed of a thin material for example a metal or plastic. The sides are formed to add as little weight as possible and can be selected to have a specific gravity as close as possible or substantially equal to the specific gravity of the working fluid, i.e., the low boiling point liquid. In a first upper position 508, the spherical magnet 500 floats on the surface of the working fluid 504 that has risen up through the connecting arm 506. As the fluid level falls, the spherical magnet falls in the direction of arrow H to a second lower position 510 aided by the weight of the tethered ballast drag element 502 that is filled with the working fluid. As the fluid level rises again and the ballast drag element is below the rising surface of the fluid level, the ballast drag element, being of substantially the same specific gravity as the working fluid, will not add weight to the hollow floating spherical magnet. An alternative arrangement can be provided where the working fluid is forced out of the interior of the ballast drag element when the spherical magnet is in the lower position. The interior of the ballast drag element would then be filled with gas, which would aid in the rising of the spherical magnet. The interior of the ballast drag element would then refill with working fluid when it reached the upper position or as it rose to the upper position. This embodiment could be facilitated by providing fluid communication from the interior of the spherical magnet through the tether to the interior of the ballast drag element. It could also utilize bladders to separate the fluid from the gas, check valves and the heating and cooling cycles of the working fluid.

In one embodiment, the specific gravity of the drag bucket is a higher specific gravity than the working fluid, but not so much greater that it would substantially detract from or compromise the effect of buoyancy, which is the force that determines the upward velocity or acceleration of the magnet through the connecting arm and coil, provided that the meniscus of the working fluid rises faster up through the column than the magnet. As the weight of the drag bucket increases, this increased weight provides a greater downward force on the magnet as a result of three factors. In the first factor, the meniscus falls below the distal extent of the drag bucket. In the second factor, the drag bucket becomes heavier as a result of a greater volume. Therefore, the meniscus will fall faster in order to clear the distal extent of the drag bucket faster and take full advantage of the extra weight that the extra volume provides. In the third factor, if the specific gravity of either the material from which the drag bucket is made or the material which is contained within the drag bucket is greater than the liquid or working fluid in which it is suspended, the weight or combined weight is selected such that it will not constitute sufficient additional upward drag to the point that the force of buoyancy is reduced to such an extent as to slow the upward motion if the magnet through the column significantly when the meniscus is made to rise upwards through the column. The added weight created by increasing the volume of the drag bucket or by increasing the specific gravity of the drag bucket or the drag bucket contents will increase the downward force on the magnet when the meniscus is made to fall below the distal extent of the drag bucket.

The meniscus is made to fall by transferring heat from a first companion unit whose meniscus has just been forced up through its connecting arm by the transfer of heat into that companion unit to a second companion unit whose meniscus is just starting to be forced up through its respective connecting arm. This allows the meniscus in the first companion unit to descend downward through its connecting arm as the pressurized refrigerant gas above the liquid/gas phase interface in the bottom container condenses back into a liquid and depressurizes the area above the liquid/gas phase interface in the bottom container, allowing the refrigerant liquid in the connecting arm to descend down through the connecting arm and into the bottom container.

Exemplary embodiments are also directed to methods for generating energy and controlling humidity on a portable platform using any embodiment of an engine and a humidity control system described herein. In one embodiment, an engine supported within a portable frame generates electrical energy using an active heat exchanger. The active heat exchanger includes an internal heat exchanger portion disposed in a container, e.g., the bottom container, that exchanges heat with a volume of low boiling point liquid. This exchange of heat transfers heat into and out of the container and low boiling point liquid, moving a buoyant magnet such as a buoyant spherical magnet floating in the low boiling point liquid reciprocally through a wire coil wrapping the hollow bore of an arm that is in communication with the container or, as described above, contained within that connecting arm. In one embodiment, the arm is the connecting arm between the two containers. The active heat exchanger also includes an external heat exchanger portion in communication with the internal heat exchanger portion and disposed in an ambient environment outside the container. The external heat exchanger portion exchanges heat with the ambient environment. This transfer of heat can generate condensate. In one embodiment, this condensate is captured using a reservoir.

The method also uses a humidity control system supported within the portable frame to maintain a desired humidity level in the ambient environment. The humidity control system is in communication with the external heat exchanger portion and obtains condensate generated by the external heat exchanger portion, for example, from the reservoir that captures the condensate. This condensate is used by the humidity control system to maintain the desired humidity level in the ambient environment, for example, by selectively reintroducing an amount of the condensate back into the ambient environment. The humidity control system can be operated to increase or decrease ambient humidity levels. In one embodiment, the condensate is used to maintain an increased humidity level. Therefore, the method is suitable for generating electricity and providing humidification in an arid environment. Alternatively, the humidity control system is operated in a humidity neutral mode, neither increasing nor decreasing humidity and maintaining an existing ambient humidity level. Therefore, the humidity control system uses the condensate to balance humidity removed from the ambient environment by the engine by reintroducing a sufficient portion of the condensate to maintain an existing humidity level in the ambient environment.

In addition to providing humidity control, the method also generates electricity. The method can use the electricity to power components of the engine and humidity control system, can provide electrical power to the room or area in which the system is located or can provide, transfer or sell electricity to the electrical grid of a power supply company. Power supply can be continuous or intermittent. For example, the electrical power can be stored in suitable storage mediums such as batteries, for example by trickle charging the batteries. The stored energy can then be delivered to the electric grid only during periods of peak demand or during a period of power outage. This would provide a source of stored energy to help meet demand. This could also maximize revenue from the sale of the generated electrical energy, as the price paid for electrical energy would be higher at times of peak demand. Therefore, in one embodiment the method delivers electrical energy generated by the engine to an electrical grid of an energy supplier. In one embodiment, the electrical energy is stored and delivered to the electrical grid intermittently only during times of peak electrical demand in the electrical grid.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:

1. A portable energy generation and humidity control system comprising:
    a portable frame;
    an engine supported within the portable frame and configured to generate electrical energy, the engine comprising:
        two containers arranged as a diametrically opposed pair in a vertical alignment having a top container and a bottom container;
        a connecting arm in communication with each container, the connecting arm comprising a central hollow bore and the diametrically opposed pair in fluid communication through the hollow bore of the connecting arm;
        a volume of a low boiling point liquid disposed in the bottom container;
        a wire coil extending along the connecting arm between the two containers;
        a buoyant permanent magnet disposed in the central hollow bore; and
        an active heat exchanger in communication with the bottom container and capable of transferring heat to and removing heat from the bottom container, the active heat exchanger comprising:
            at least one internal heat exchanger portion disposed in the bottom container in communication with at least one of the liquid disposed in the bottom container and a gas space above the liquid; and
            at least one external heat exchanger portion in communication with the internal heat exchanger portion and arranged to exchange heat with an ambient environment; and
    a humidity control system supported within the portable frame and in communication with the engine, the humidity control system working in conjunction with the engine to maintain a desired humidity level in the ambient environment.

2. The system of claim 1, wherein:
    the engine and humidity control system are contained completely within the portable frame; and
    the portable frame is sized to be moved between rooms within a building.

3. The system of claim 1, wherein the portable frame comprises a rolling frame.

4. The system of claim 1, wherein the humidity control system comprises:
    a liquid reservoir in communication with the external heat exchanger portion to collect condensate generated by the external heat exchanger portion; and
    a humidifier in communication with the liquid reservoir to introduce liquid from the liquid reservoir into the ambient environment.

5. The system of claim 4, wherein the humidity control system further comprises at least one humidity sensor to monitor a current humidity level in the ambient environment.

6. The system of claim 4, wherein the humidifier comprises a cold mist humidifier.

7. The system of claim 6, wherein the cold mist humidifier comprises an evaporative humidifier or an ultrasonic humidifier.

8. The system of claim 1, wherein the humidity control system is in communication with the wire coil to obtain electricity from the engine.

9. The system of claim 1, wherein the ambient environment comprises a room within a building.

10. The system of claim 1, wherein the at least one internal heat exchanger portion comprises a first heat exchanger portion disposed in the bottom container in communication with the liquid disposed in the bottom container; and
a second heat exchanger portion disposed in the bottom container in a gas space above the liquid; and
the at least one external heat exchanger portion comprises a third heat exchanger portion.

11. The system of claim 10, wherein the active heat exchanger comprises a controller portion in communication with the first, second and third heat exchanger portion and the humidity control system, the controller portion comprising at least one compressor, at least one valve and control electronics, the controller portion capable of directing the active heat exchanger to either transfer heat to or to extract heat from the bottom container.

12. The system of claim 1, wherein the low boiling point liquid comprises chlorofluorocarbons, hydrofluorocarbons, liquid ammonia, propane, carbon dioxide or butane.

13. The system of claim 1, wherein the buoyant permanent magnet comprises a hollow spherical magnet or a hollow weighted buoy shaped magnet.

14. The system of claim 13, wherein an entire outer surface of the buoyant permanent magnet comprises a first pole.

15. The system of claim 1, further comprising a biasing member attached to the buoyant permanent magnet and configured to bias the buoyant permanent magnet towards the bottom container.

16. A method for generating energy and controlling humidity on a portable platform, the method comprising:
using an engine supported within a portable frame to generate electrical energy using an active heat exchanger comprising:
an internal heat exchanger portion disposed in a container to exchange heat with a volume of low boiling point liquid and move a buoyant permanent magnet floating in the low boiling point liquid reciprocally through a wire coil extending along a hollow bore in communication with the container; and
an external heat exchanger portion in communication with the internal heat exchanger portion and disposed in an ambient environment outside the container to exchange heat with the ambient environment; and
using a humidity control system supported within the portable frame and in communication with the external heat exchanger portion to obtain condensate generated by the external heat exchanger portion and to use the condensate to maintain a desired humidity level in the ambient environment.

17. The method of claim 16, wherein using the humidity control system further comprises using the condensate to maintain an increased humidity level.

18. The method of claim 16, wherein using the humidity control system further comprises using the condensate to balance humidity removed from the ambient environment by the engine and to maintain an existing humidity level in the ambient environment.

19. The method of claim 16, wherein the method further comprises delivering electrical energy generated by the engine to an electrical grid of an energy supplier.

20. The method of claim 19, wherein delivering electrical energy to the electrical grid further comprises storing the electrical energy and delivering the electrical energy to the electrical grid intermittently only during times of peak electrical demand in the electrical grid.

\* \* \* \* \*